Nov. 8, 1949     J. L. JOURGENSEN     2,487,557
ANIMAL MARKING DEVICE

Filed Sept. 1, 1944     3 Sheets-Sheet 1

Inventor
John L. Jourgensen

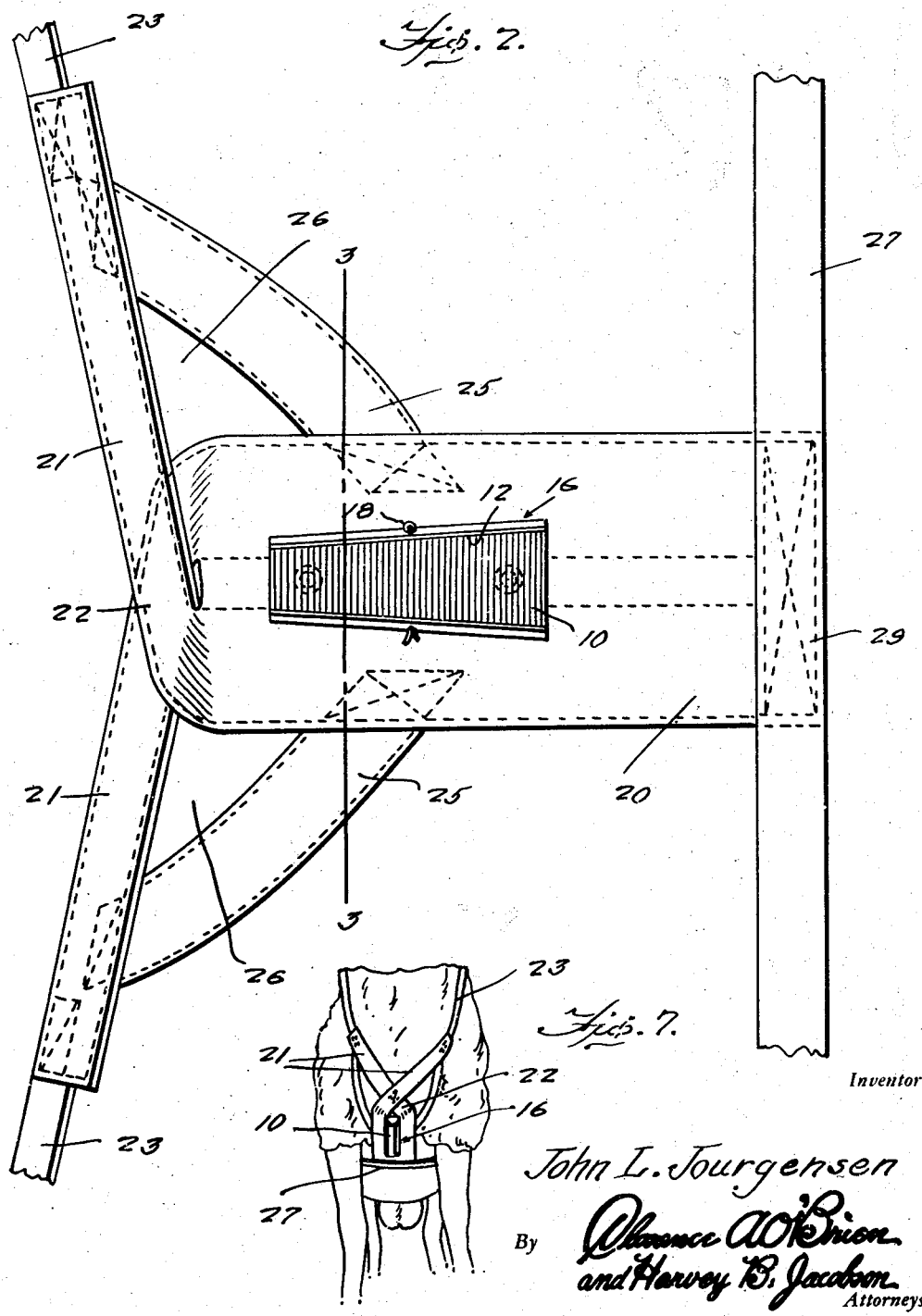

Nov. 8, 1949 J. L. JOURGENSEN 2,487,557
ANIMAL MARKING DEVICE
Filed Sept. 1, 1944 3 Sheets-Sheet 3
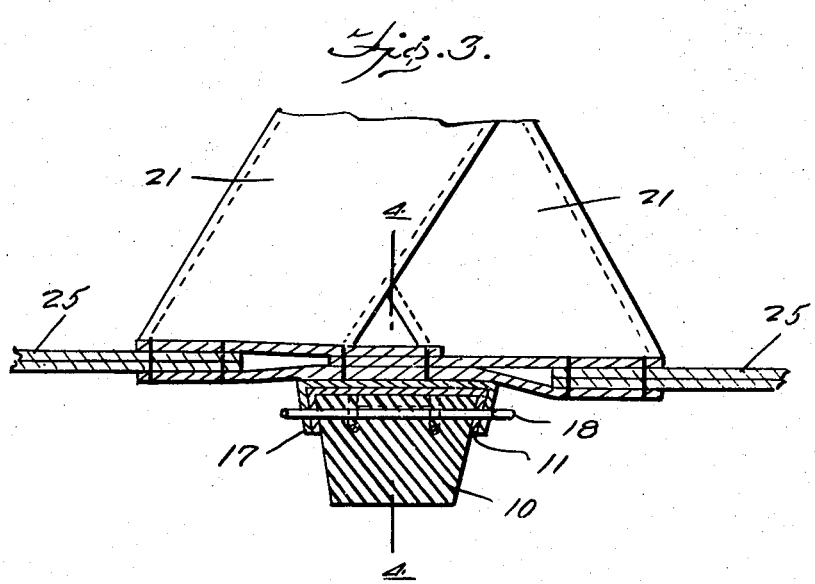
Fig. 3.
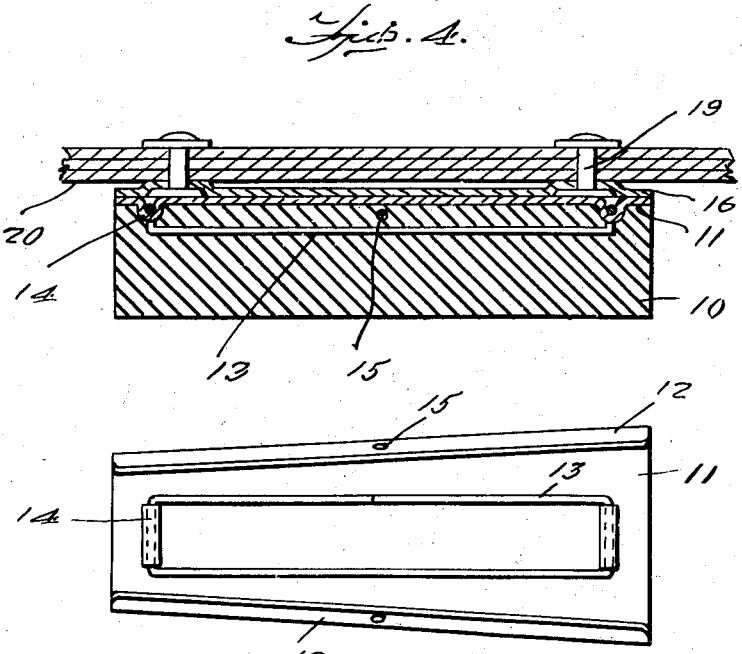
Fig. 4.
Fig. 6.
Inventor
John L. Jourgensen
By Clarence A. O'Brien
and Harvey B. Jacobson
Attorneys Patented Nov. 8, 1949

2,487,557

UNITED STATES PATENT OFFICE 2,487,557

ANIMAL MARKING DEVICE

John L. Jourgensen, Casper, Wyo.

Application September 1, 1944, Serial No. 552,354

1 Claim. (Cl. 54—1)

This invention pertains to an animal marking apparatus or more particularly sheep marking for use during the breeding season and consists in the combination of two main devices, namely, a marking pad and an attachment or harness for securing the pad in position on an animal.

The aim of the invention is to supply an apparatus of this character of simple construction, at low cost, made of easily obtainable material, having great strength and being easily adjusted and applied. It has the further advantage that a pad of a special crayon composition, will last at least ten days, so that, after the lapse of that period, all ewes having received a mark indication coition with a ram, may be withdrawn from the flock. The period of gestation of the female sheep (ewes) is then figured and in the spring when the ewes are giving birth to lambs, the stockmen are able to prepare proper feed, water and shelter for a known number of lambs and their mothers. This apparatus also has the advantage that fewer rams will be needed for a certain size of flock. So for instance, one stockman using this harness and marker for a flock claims that whereas it required six rams for every two hundred sheep, he now uses at the rate of three rams for each hundred-fifty ewes, amounting to a saving of $2000.00 a year. This also makes a corresponding saving of feed and water, labor of tending the flock; all of which are great items in dry, arid wool growing States.

If, on the other hand, a stockman does not wish to withdraw ewes having received mark indicating coition, he may, by a simple change in color of crayon, continue the rams in the band of sheep, and at the end of another ten day period, determine the time when the second bunch of mothers will have lambs. This gives the stockman the advantage of handling only small bunches of mothers at a time during spring lambing, eliminating the need of shed shelter, feed, and labor which would be necessary if the whole band of sheep had to be cared for on the lambing ground, at one time.

The apparatus is so constructed that the several parts do not have sharp edges which would catch on the female animal's back, and does not restrict proper action of the male animal during the process of coition.

It is further possible to determine from the use of this marking compound and apparatus placed on a ram of doubtful reproductive ability whether or not he is covering an average number of ewes, if not, he can be removed. If he covers an average number of ewes but lamb crop from his coition with ewes is low he will then be eliminated.

In the accompanying drawings, wherein like numerals denote the same details in the different views, one embodiment of the invention is represented.

Figure 2 is a bottom plan view of the main portion of the harness showing the crayon pad in position.

Figure 3 is a transverse section along line 3—3 of Figure 2.

Figure 4 is a vertical section along line 4—4 of Figure 3.

Figure 6 is a plan view of the holder alone, and

Figure 7 is a front view of the harness in position around the ram's neck.

Figure 5:
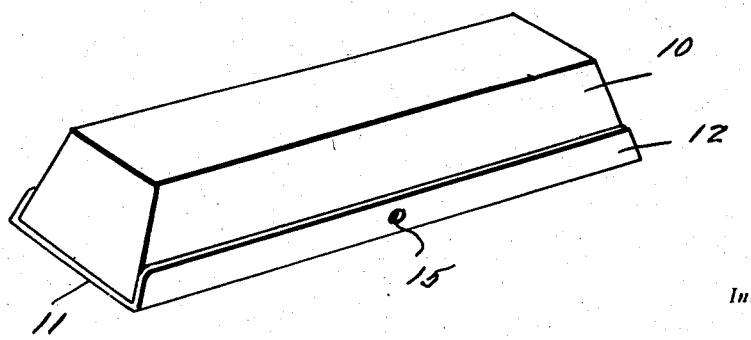
Figure 5 is a perspective view of the crayon or marking pad in its tray, upside down.

Regarding first the marking pad or crayon 10, Figure 5, the same is compact to fit in an oblong tray or holder 11, see particularly Figures 3, 4, 5 and 6, and to have sufficient firmness and consistency without deterioration, melting or loss of marking efficiency at temperatures ranging from 90° F. down to 10° below zero.

This crayon 10 is compounded in the following manner of the ingredients in approximate weight proportions:

| | Parts |
|---|---|
| Mineral wax | 38.70 |
| Coloring matter of mineral or animal pigment | 25.80 |
| Mineral oil | 19.35 |
| Amphibole fiber | 38.73 |

The mineral wax is used for carrying color so as not to be rubbed out too quickly and is not a sticky type of wax.

The mineral oil is provided to soften the crayon sufficiently to insure marking between the temperature limits stated, yet its combination with the mineral wax prevents a too rapid marking.

The amphibole fiber, which is a compound of calcium, magnesium and silica, functions to give to the crayon sufficient texture and tenacity not to slip off the reinforcing wire by which it is retained on the tray.

The mineral wax is heated in a kettle until completely melted at a temperature from 120 to 122° F. The coloring material is thereupon added under continuous agitation. Lastly at a temperature of about 140° F. the amphibole fiber is added with continuous agitation. Lowering the temperature to about 135° F. the compound is then poured and shaped in collapsible wooden molds in which said trays have been first deposited.

The tray 11, made of sheet material, metal or plastic, has a flat bottom, tapering in length direction and provided with side flanges 12, bent upwardly, slightly inclined so as to have a good hold on the crayon proper 10. In order to still further insure a good hold, a bent wire 13 is secured in the bottom, slightly spaced therefrom, in eyelets 14. A hole 15 is provided in the tray for locking the tray to the harness by means of a pin 18.

This tray is placed in the collapsible mold and the crayon compound poured over it. After cooling, the crayon is cut out from the mold and, adhering to the tray 11 as a unit, forms the marker proper.

This crayon unit 10, 11 fits in corresponding holder 16 firmly secured on the harness. This holder is of the same tapered shape as the tray 11 and is provided with side flanges 17 adapted to engage the corresponding tray flanges 12 to hold the marking pad in place on the harness. This holder is also made of sheet material and attached as by rivets 19 to the harness fabric. The marking pad 10, 11 is locked in position by a cotter pin 18, engaging in corresponding holes 15 provided in the flanges 12 and 17. In order to give proper registration between said holes and the crayon 10, a hot awl may be run through the same from the holes 15.

Figure 1:
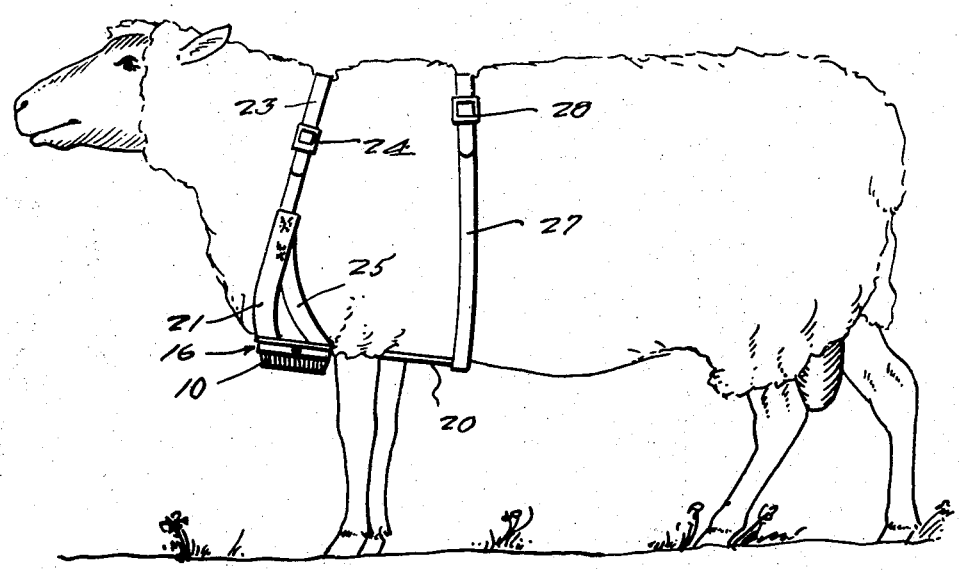
Figure 1 is a side elevation of a harness as applied on a ram.

The harness proper, best seen in Figures 2, 3 and 4 in detail and assembled in Figures 1 and 7 consists of a large breast pad 20, made of heavy canvas or other textile material formed with a pair of forward arms 21 which are shown crossed at 22 and are stitched together. Suitable canvas straps 23 form extensions to the arms 21 adapted to be tied together by a buckle 24 around the ram's neck.

Diagonal straps 25 connect the pad 20 with the arms 21 being firmly stitched thereto so as to fit around the chest portion of the animal and its brisket. Lastly a pair of straps 27 with buckle 28 are stitched across the rear end of the pad as at 29. These straps are intended for encircling the ram's body and are united by the buckle 28 to provide a firm hold on the ram around its shoulder, just back of the front legs.

As indicated in Figure 1 the crayon pad or marker will in this manner be secured near and in front of the fore legs of the animal, so that a colored mark or impression will be made as a distinguishing mark on the ewe's back after coition.

It is to be understood that the invention as here described is not limited to the details here described and shown but that the same may be varied widely without departing from the spirit of the invention as defined by the subjoined claim.

I claim:

A harness for supporting the crayon of a marking device for male animals, comprising an elongated rectangular canvas breast shield carrying a crayon holder on its front portion, located in front of the fore legs, said front portion being provided with two projecting strips crossed and secured together, diagonal strips joining each projecting strip to the middle portion of the breast shield, holding straps running over the nape of the neck of the animal attached to the ends of said projecting strips, and a further belt like strap, attached transversely to the rear end of the elongated shield encircling the body of the animal behind the fore legs.

JOHN L. JOURGENSEN.

REFERENCES CITED

The following references are of record in the file of this patent:

UNITED STATES PATENTS

| Number | Name | Date |
| --- | --- | --- |
| 128,236 | McIntyre | June 25, 1872 |
| 838,310 | Evans | Dec. 11, 1906 |
| 1,237,983 | Werner | Aug. 21, 1917 |
| 2,286,018 | Smith | June 9, 1942 |

FOREIGN PATENTS

| Number | Country | Date |
| --- | --- | --- |
| 455 | Germany | Aug. 4, 1877 |
| 414,378 | France | June 17, 1910 |
| 692,412 | France | Aug. 4, 1930 |